United States Patent Office 3,494,985
Patented Feb. 10, 1970

3,494,985
PREPARATION OF FIRE-RETARDANT
THERMOPLASTIC COMPOSITIONS
Raymond R. Hindersinn, Lewiston, N.Y., and John F. Porter, Durham, N.C., assignors to Hooker Chemical Corporation, Niagara Falls, N.Y., a corporation of New York
No Drawing. Filed May 10, 1965, Ser. No. 454,701
Int. Cl. C08f 29/12; C09k 3/28
U.S. Cl. 260—889       14 Claims

ABSTRACT OF THE DISCLOSURE

Fire-retardant, halogen containing polymer compositions, useful in industrial applications such as wire coatings, pipes and conduits, and for other industrial moldings and extruded products are produced by a process which comprises mixing (1) a polymer of an ethylenically unsaturated hydrocarbon and (2) an adduct of a butadiene polymer and a polyhalogenated cyclopentadiene, in the presence of (3) a diluent, to produce an intermediate polymer composition; and thereafter, concurrently heating and masticating said intermediate polymer composition and evaporating said diluent therefrom to produce vapors of said diluent and a final polymer composition that is substantially free of said diluent.

---

This invention relates to novel halogen-containing polymer compositions, and particularly to processes for producing such compositions.

Polymeric materials are being used more widely every year in industrial applications such as wire coatings, pipes and conduits, and for other industrial moldings and extruded products. These and other uses are better served by polymer compositions that are fire retardant and flame resistant. Prior art attempts to impart fire resistance to thermoplastic polymers by the use of additives have often adversely affected the desirable properties of the polymer. Thus, in some cases, such additives exert a plasticizing effect on the base polymer, thereby lowering the heat distortion point. In other cases, the additives are volatile, and migrate out of the polymer, especially after extended exposure to elevated temperatures.

Accordingly, it is an object of this invention to provide methods for preparing superior fire-retardant polymer compositions. It is another object of the invention to provide methods for reducing the flammability of the normally flammable, thermoplastic polymer compositions. It is a further object of the invention to provide polymer compositions that are not only fire retardant but which have other superior thermal and mechanical properties.

This invention relates to polymer compositions comprised of a polymer of an ethylenically unsaturated hydrocarbon, and an adduct of a butadiene polymer and a polyhalogenated cyclopentadiene having the formula

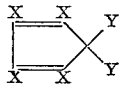

wherein X is selected from the group consisting of fluorine, chlorine and bromine, and Y is selected from the group consisting of fluorine, chlorine, bromine and an alkoxy radical. The invention further relates to the preparation of such compositions by a method wherein the polymer of an ethylenically unsaturated hydrocarbon is intimately mixed with the adduct of a butadiene polymer and a polyhalogenated cyclopentadiene in a suitable diluent, and thereafter the resulting composition is passed through a heated zone wherein the composition is concurrently subjected to mixing and vacuum conditions to cause evaporation of the diluent and to produce a polymer composition substantially free of the diluent. In a preferred aspect of the invention, the diluent in the foregoing process is a polyhalogenated cyclopentadiene.

The polymers of an ethylenically unsaturated hydrocarbon embraced within the scope of this invention are the homopolymers and copolymers of unsaturated aliphatic, cycloaliphatic and aromatic hydrocarbons. Suitable monomers generally have two to about eight carbon atoms per molecule. Typical monomers used for the production of such polymers are: ethylene, propylene, butene, pentene, hexene, heptene, octene, 2-methyl propene-1; 3-methyl butene-1; 4-methyl pentene-1; 4-methyl hexene-1; 5-methyl hexene-1; bicyclo-(2.2.1)-2-heptene; butadiene, pentadiene, hexadiene, isoprene, 2,3-dimethyl-butadiene-1,3; 2-methylpentadiene-1,3; 4-vinylcyclohexene, cyclopentadiene, styrene, methyl styrene, and the like. Homopolymers of the foregoing monomers can be employed, as well as copolymers such as ethylene-propylene copolymers, ethylene-butene copolymers, ethylene-hexene copolymers, and the like. Also suitable are the graft and block copolymers of the foregoing monomers, such as the graft copolymers of polybutadiene with polymerizable compounds such as styrene, α-methyl styrene, and the like. Other suitable polymers of an ethylenically unsaturated hydrocarbon include graft copolymers involving other polymerizable compounds containing aliphatic carbon-to-carbon unsaturation, such as graft copolymers of a polybutadiene with styrene and acrylonitrile.

The preferred homopolymers of an ethylenically unsaturated hydrocarbon are polypropylene, polyethylene and polystyrene. Low density polyethylenes are produced by polymerization of ethylene at a pressure greater than 1,200 atmospheres and at a temperature of 100 to 300 degrees centigrade. Lower pressures of about 500 atmospheres can be used if catalyst such as oxygen or benzoyl peroxide is employed. Polyethylenes and polypropylenes are also produced with organometallic catalysts and supported metal oxide catalysts in the presence of an inert, hydrocarbon solvent at temperatures in the range of 50 to 230 degrees centigrade. Polystyrene is readily produced by mass solution or emulsion polymerization techniques. The polymerization is promoted by the action of light and catalysts such as hydrogen peroxide, benzoyl peroxide and other organic peroxides. Suitable solvents for solution polymerization include toluene, xylene and chlorobenzene.

The preferred graft copolymers for use in preparing the compositions of the invention are the copolymers of a polymerizable compound containing aliphatic carbon-to-carbon unsaturation and a butadiene polymer, particularly a polybutadiene. Typical polymers of butadiene are the various ethylenically unsaturated polybutadienes prepared by mass, solution or emulsion polymerization techniques, butadiene-styrene block copolymers produced by emulsion and solution methods, and the like. The polymerizable compounds useful in preparing the graft copolymers are generally those unsaturated monomers containing aliphatic carbon-to-carbon unsaturation, which are polymerizable or copolymerizable by free radical catalysts either alone or in admixture with other polymerizable compounds. Suitable polymerizable compounds include: the vinyl aromatic compounds such as styrene, vinyl toluene and α-methyl styrene; acrylonitrile, methacrylonitrile, and the like; the acrylamides, such as acrylamide, N,N-dimethyl acrylamide, N-cyclohexyl acrylamide, methacrylamide, and the like; acrylic acid and its esters such as methyl acrylate, butyl acrylate, methoxy ethyl acrylate, and the like; methacrylic acid and its esters such as methyl methacrylate, lauryl methacrylate, and the like; crotonic acid and its esters, such as ethyl crotonate, and the like; α,β-unsaturated acids and esters, such as maleic anhydride, fumaric acid, dimethyl maleate, and the like; and other polymerizable or copolymerizable, unsaturated monomers. Especially useful are mixtures of the foregoing monomers.

The polyhalogenated cyclopentadienes useful in forming the adducts with butadiene polymers generally have the formula:

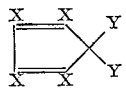

wherein X is selected from the group consisting of fluorine, chlorine and bromine; and Y is selected from the group consisting of fluorine, chlorine, bromine and an alkoxy radical. Typical polyhalogenated cyclopentadienes are hexachlorocyclopentadiene, hexabromocyclopentadiene, 5,5 - dibromotetrachlorocyclopentadiene, 5,5 - difluorotetrachlorocyclopentadiene, 5,5 - dimethoxytetrachlorocyclopentadiene, 5,5 - diethoxytetrachlorocyclopentadiene, and the like. Generally, the alkoxy radicals have one or two carbon atoms, but higher carbon chains, for example, up to four carbon atoms, can be employed. The incorporation of the polyhalogented cyclopentadiene in the butadiene polymers generally ranges between about 0.2 and 0.9 mole per mole of combined butadiene, preferably 0.6 to 0.9 mole per mole. When the halogenated cyclopentadiene is hexachlorocyclopentadiene, an incorporation of 0.6 to 0.9 mole per mole provides a polymer with a chlorine content of about 59 to 64 weight percent.

Polymers of butadiene that can be reacted or adducted with the polyhalogenated cyclopentadienes are the various ethylenically unsaturated polybutadienes prepared by mass, solution or emulsion polymerization techniques, butadiene-styrene copolymers and block copolymers produced by emulsion and solution methods, respectively, butadiene-acrylonitrile copolymers, and the like. Particularly useful are the polybutadienes which contain at least 30 percent of the cis 1,4-configuration, and preferably at least 80 percent of the cis 1,4-configuration, and still more preferably at least 90 percent of the cis 1,4-configuration. A process for producing a polybutadiene having such a high cis 1,4-content comprises reacting 1,2-butadiene in the presence of a catalyst composition comprising titanium tetraiodide and an organo metal compound such as dimethyl mercury, diethyl mercury, dibutyl mercury, dimethyl zinc, dibutyl zinc, and the like. The reaction is carried out at a temperature in the range of minus 80 to 150 degrees centigrade in the presence of a hydrocarbon diluent such as toluene. At the completion of the polymerization reaction, the catalyst is deactivated and the polymer is precipitated from the reaction mixture.

In the process for adducting the halogenated cyclopentadiene to a butadiene polymer by the Diels-Alder reaction, at least about 5 parts of polyhalogenated cyclopentadiene per part of butadiene polymer are utilized in the reaction mixture. Much larger quantities of halogenated cyclopentadiene can be utilized, e.g., up to 100 parts of halogenated cyclopentadiene per part of butadiene polymer and higher. It is convenient to use the halogenated cyclopentadiene as the sole diluent or liquid medium in the reaction mixture. However, other diluents that are not deleterious to the reaction can be used, for example, the aromatic hydrocarbons such as benzene, toluene, xylene, and the like; chlorinated hydrocarbon such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at superatmospheric pressure or under vacuum. During the course of the reaction, some halogen halide may be produced. The color of the resulting product can be improved by absorbing the hydrogen halide by including a scavenger such as an epihalohydrin or other epoxide, in the reaction zone. It is sometimes desirable to include other additives in the reaction mixture to control the molecular weight of the polymer product. The crude reaction mixture at the end of the reaction generally contains at least about 5 weight percent and up to about 50 weight percent halogencontaining polymer, preferably in the range of about 20 to 40 weight percent.

In accordance with the process of the invention, the polymer of an unsaturated hydrocarbon, and additives, if desired, is mixed with the reaction product of the butadiene polymer and the halogenated cyclopentadiene in the presence of excess halogenated cyclopentadiene and/or other diluent if desired, in a ratio to provide the desired proportion of the polymers in the final polymer composition. The presence of the diluent, especially the polyhalogenated cyclopentadiene, facilitates the mixing of the polymer components. The foregoing mixing step can be accomplished at ambient temperature, i.e., about 25 degrees centigrade or at elevated temperatures up to about 100 degrees centigrade, or generally up to about 200 degrees centigrade. The mixing step can be accomplished in a suitable mixer that is appropriate for the physical properties of the composition at the mixing temperature. Thus, if the mixing is carried out at or near ambient temperatures, a suitable mixing device is a sigma blade mixer, or other similar device capable of handling a viscous, dough-like or semi-solid composition. If higher mixing temperatures are utilized, other types of mixers, such as impellers, are also suitable. The mixing step can be carried out for a period of time in the range of 5 minutes to an hour. Thereafter, the resulting composition is introduced into a heated zone adapted for the removal of diluent vapors and for the agitation of the polymer composition under increasingly viscous conditions. The heated zone is generally adapted for the application of vacuum to facilitate the removal of the diluent vapors. This zone is preferably an extrusion zone which is particularly suited to the handling of highly viscous polymer compositions. Suitable equipment for carrying out this step are the several "vented extruders" and "extractor extruders" that are available commercially. These extruders are generally equipped with one or more vented zones for removal of vapors resulting from the evaporation of the reaction diluent. In these extrusion devices, the polymer composition is subjected to a combination of shearing action, kneading, compacting and mixing actions which continually provide newly exposed surfaces of polymer composition within the heated extrusion zone which facilitate the evaporation of the reaction diluent from the polymer composition. This combination of physical forces acting on the polymer is referred to as "mastication" in this specification and claims. The heated zone is generally maintained in a temperature range of 125 to 300 degrees centigrade, preferably in the range of about 150 to 250 degrees centigrade. The residence time of the polymer composition in the zone generally ranges from one minute or less to one hour or more.

The process of the invention has many advantages. It is possible to utilize the crude reaction product from the preparation of the polyhalogenated polymer in the production of composite polymer compositions, rather than resorting to intermediate isolation of the polyhalogenated product from its reaction medium. The presence of the reaction medium, particularly the polyhalogenated cyclopentadiene, with the polyhalogenated polymer facilitates the mixing of that polymer with the polymer of an unsaturated hydrocarbon. After the mixing process, the diluent is readily removed from the combined polymer composition and the composition is further intimately mixed in the process of concurrently heating the polymer, masticating the polymer, and evaporating the diluent vapors from the polymer to produce diluent vapors and a polymer product that is substantially free of diluent. By "substantially free" is meant that the polymer composition contains less than one percent diluent based on the weight of polymer composition.

The flame-retardant characteristics of the polymer compositions of the invention are further improved by incorporating antimony compounds therein. Antimony oxide is the preferred antimony compound. However, many other antimony compounds are suitable. Inorganic antimony compounds include antimony sulfide, sodium antimonite, potassium antimonite, and the like. The corresponding arsenic and bismuth compounds can also be employed.

The polymer compositions of the invention generally comprise about 5 to about 50 weight percent of polyhalogenated polymer based on the weight of the total polymer composition. The preferred range is from about 10 to about 40 weight percent; still more preferably in the range from about 15 to about 35 weight percent of the polyhalogenated polymer. When an antimony compound is employed in the polymer compositions, the antimony compound can be used in a proportion up to about 30 percent by weight of the polymer composition, preferably from about 2 to about 20 percent by weight. The polymer compositions of the invention generally comprise at least about 15 percent by weight of the ethylenically unsaturated hydrocarbon polymer.

The invention is further described in the following specific examples which are intended to further illustrate the invention but not to limit it. In these examples, the temperatures are in degrees centigrade, and the parts are by weight unless indicated otherwise.

PREPARATION OF POLYHALOGENATED POLYMER

Example 1

6.75 parts by weight of a polybutadiene rubber having at least 95 percent cis-1,4 content and 1.6 parts by weight of epichlorohydrin were mixed with 81 parts by weight of hexachlorocyclopentadiene. The mixture was heated at about 100 degrees until the rubber was in solution. The temperature was raised to 150 degrees and maintained one hour while the reaction proceeded in an air atmosphere. The reaction mixture was blanketed with nitrogen and 0.275 part of m-dinitrobenzene was added and the reaction was completed at 150 degrees in 4 hours. A sample of polymer product was isolated for analysis and found to contain 58.7 percent chlorine and to have an intrinsic viscosity of 0.462 in toluene.

Example 2

Seventy-five parts by weight of a polybutadiene rubber having a cis-1,4 content of about 95 percent and 900 parts by weight of hexachlorocyclopentadiene that have been treated with magnesium carbonate for removal of impurities, and 15 parts of epichlorohydrin were introduced into a reactor. The mixture was heated at 90 to 100 degrees to dissolve the rubber. The reaction was conducted at 150 degrees for one hour. Then, the 0.3 part of m-dinitrobenzene was added to the mixture and the reaction was continued for 4 hours at 150 degrees centigrade with agitation. A sample of polymer produced was isolated from the reaction mixture for analysis and was found to have a chlorine content of 63.6 weight percent.

Example 3

Fifteen parts by weight of polybutadiene having a cis-1,4 content of about 95 percent, 180 parts by weight of 1,2,3,4-tetrachloro-5,5-dimethoxycyclopentadiene, and 3 parts by weight of epichlorohydrin were heated in an open reactor at 98–106 degrees centigrade for about one hour until the rubber was in solution. The reactor temperature was raised to 150 degrees centigrade for 5 hours. At the end of the reaction, a sample of polymer was isolated from the reaction mixture for analysis and found to have a chlorine content of 39.4 weight percent.

Example 4

Seventy-five parts by weight of a polybutadiene having a cis-1,4 content of 35 percent were heated with 600 parts by weight of hexachlorocyclopentadiene and about 15 parts by weight of epichlorohydrin at 100–112 degrees centigrade for 3 hours in an air atmosphere. Then, an additional 300 parts by weight of hexachlorocyclopentadiene were added to the reactor, and heating was continued until all the rubber was in solution. Thereafter, the reaction temperature was raised to 147–150 degrees centigrade for about 8.5 hours. At the end of the reaction, a sample of polymer was isolated from the reaction mixture for analysis and was found to have a chlorine content of 50.8 weight percent.

POLYMER COMPOSITIONS OF INVENTION

Example 5

A mixture was prepared containing 56.5 parts by weight of the polymer composition of Example 2, 34.2 parts by weight of powdered, isotactic polypropylene and 9.3 parts by weight of antimony trioxide. The mixture was blended at ambient temperature in a sigma blade mixer until the composition was substantially homogeneous. The composition had a sticky, doughly consistency. This material was passed through a Welding Engineers' Model Point-Eight twin screw multi-vented extruder at various speeds. Both vents on the extruder were used, and vacuum means were connected to both vents. The extruder was operated at speeds of 30, 100 and 150 revolutions per minute at temperatures in the range of 175 to 200 degrees centigrade. The resulting extrudates were in a form that could be chopped into prills without further treatment. The prills were injection molded at 190 degrees centigrade into rectangular test bars, and subjected to mechanical testing. Moreover, it was found that the extruded composition was substantially free of the hexachlorocyclopentadiene diluent (less than one weight percent). And comprised about 55 weight percent polypropylene, 30 percent by weight halogenated polymer and 15 percent by weight of antimony trioxide. The mechanical properties of the test specimens are shown in Table I. The polymer composition was found to be immediately self-extinguishing by ASTM D–635–56T. By comparison, the polypropylene alone was rated "burning" by the same test.

TABLE I

|  | Example 5 | | | Polypropylene Alone |
|---|---|---|---|---|
|  | 30 r.p.m. | 100 r.p.m. | 150 r.p.m. |  |
| Heat Distortion Point in ° C. at 66 pounds per square inch | 136 | 129 | 126.5 | 110.5 |
| Flexural Strength, pounds per square inch | 7,573 | 6,800 | 7,493 | 8,320 |
| Flexural Modulus, pounds per square inch | $3.18 \times 10^5$ | $2.57 \times 10^5$ | $2.88 \times 10^5$ | $2.77 \times 10^5$ |
| Shore D Hardness | 76.7 | 74.3 | 75.2 | 73 |

The foregoing data show that the polymer composition of the invention had heat distortion points at 66 pounds per square inch of 16 to 26 degrees centigrade greater than the polypropylene alone. Moreover, the hardness of the composition of the invention was improved somewhat, and properties such as flexural strength and flexural modulus are not adversely affected by the incorporation of the polyhalogenated polymer into the polypropylene.

Example 6

A mixture was prepared containing 65.1 weight percent of powdered, isotactic polypropylene and 34.9 parts by weight of the reaction product of Example 2. The mixture was blended in a sigma blade mixer at ambient temperature until substantially homogeneous at which time it had a sticky, dough consistency. Thereafter, the polymer composition was passed through a Welding Engineers' Model Point-Eight twin screw multi-vented extruder, operated at a speed of 30 revolutions per minute and at temperatures in the range of 175 to 200 degrees centigrade. The residence time of the polymer composition in the extrusion zone was about one hour. Both vents of the extruder were used and connected to vacuum means to facilitate removal of the diluent vapors. The resulting extrudate was in a form that could be chopped into prills without further treatment. The extruder polymer composition contained about 85 weight percent polypropylene, 15 weight percent halogenated polymer, and was substantially free of hexachlorocyclopentadiene (less than one weight percent). The polymer prills were injection molded at 190 degrees centigrade into rectangular test bars and discs suitable for mechanical and electrical testing. The test results are shown in Table II where comparison is made with the properties of polypropylene alone.

TABLE II

|  | Polymer of Example 6 | Polypropylene Alone |
|---|---|---|
| Heat Distortion Point in ° C., at 66 pounds per square inch | 124.5 | 110.5 |
| Shore "D" Hardness | 74.4 | 73 |
| Flexural Yield Strength, pounds per square inch | 7,710 | 8,320 |
| Flexural Modulus, pounds per square inch | 2.12×10⁵ | 2.77×10⁵ |
| Dielectric Strength, step by step, volts per mil | 461 | 537 |
| Dielectric Strength, short time, volts per mil | 503 | 527 |
| Dielectric Constant, 10⁶ cycles per second | 2.32 | 2.33 |
| Dissipation Factor, 10⁶ cycles per second | 0.0014 | 0.0004 |
| Arc Resistance, seconds | 39 | 197 |
| Volume Resistivity (as received) | ∞ | 1.86×10¹⁶ |

The data indicates that the heat distortion point of the composition of the invention was 15 degrees centigrade above the value for polypropylene alone. The other properties of the composition were substantially the same as those of polypropylene alone, within the limits of experimental error.

Example 7

A mixture was prepared containing 375 parts by weight of powdered, 0.924 density polyethylene, 680 parts by weight of the reaction mixture produced in Example 1, and 102 parts by weight of antimony trioxide. The mixture was blended in a sigma blade mixer at ambient temperature until the polymer composition was substantially homogeneous. Thereafter, the polymer composition was passed through a Welding Engineers' twin screw vented extruder operated at a speed of 30 revolutions per minute and at temperatures in the range of 150 to 225 degrees centigrade. Three vents of the extruder were connected to vacuum means to facilitate removal of the diluent vapors. The extruded product contained about 55 parts by weight of polyethylene, 30 parts by weight of halogenated polymer and 15 parts by weight of antimony oxide, and was substantially free of hexachlorocyclopentadiene. The extruded polymer was molded into test specimens which were subjected to a series of mechanical and electrical tests, the results of which are shown in Table III wherein comparision is made with the properties of polyethylene alone.

TABLE III

|  | Polymer of Example 7 | Polyethylene Alone |
|---|---|---|
| Heat Distortion Temperature at 66 p.s.i., ° C | 73 | 45 |
| Shore D Hardness | 57 | 52 |
| Flexural Yield Strength, p.s.i | 2,150 | 1,327 |
| Flexural Modulus, p.s.i | 6.5×10⁴ | 2.58×10⁴ |
| Flammability, ASTM D-635-56T | (¹) | (²) |

¹ Immediately self-extinguishing.
² Burning.

In addition to the foregoing quantitative data on fire resistance of the compositions of the invention, it was further observed that the samples of polymer compositions of the invention do not drip when subjected to the flammability test, whereas polyethylene alone drips and runs severely. Thus, in the presence of a fire polyethylene alone not only burns readily but also would contribute to the spread of the flames as a result of the flow of the molten polymer. It is apparent that the incorporation of the polyhalogenated polymer in the compositions with polyethylene results in a product that is far superior to the polyethylene alone, not only in fire retardancy but also in mechanical properties.

Example 8

A mixture was prepared containing 386 parts by weight of 0.924 density polyethylene and 227 parts by weight of the reaction product of Example 1. The composition was mixed in a sigma blade mixer until the composition was substantially homogeneous. Thereafter, the polymer composition was passed through a Welding Engineers' twin screw vented extruder, operated at 30 revolutions per minute and at temperatures in the range of 150 to 200 degrees centigrade. Vacuum means were connected to both vents of the extruder to facilitate removal of the diluent vapors. The residence time of the polymer composition in the extruder was about one hour. The extruded polymer contained about 85 weight percent polyethylene and 15 weight percent polyhalogenated polymer. The polymer product was used to form molded articles.

Examples 9 and 10

Other polymers of an ethylenically unsaturated hydrocarbon are readily employed in the invention in accordance with the processes employed in the foregoing examples. Particularly suitable for use in the process of the invention are the following polymers:

Example 9—Polystyrene.

Example 10—Graft copolymer of 30 parts polybutadiene with 70 parts of a mixture of 1.5 parts of styrene and 0.8 part of acrylonitrile per part of polybutadiene.

While the invention has been described with reference to certain specific embodiments, it will be recognized by those skilled in the art that many variations are possible without departing from the spirit and scope of the invention.

What is claimed is:

1. A process which comprises mixing at about 25 to about 200 degrees centigrade (1) a thermoplastic polymer of an ethylenically unsaturated aliphatic, cycloaliphatic or aromatic hydrocarbon of 2 to about 8 carbon atoms per molecule and (2) an adduct of a butadiene polymer and a polyhalogenated cyclopentadiene, in the presence of (3) about 100 to about 1900 weight percent based on the weight of said adduct of a liquid diluent selected from the group consisting of a polyhalogenated cyclopentadiene, an inert diluent and mixtures thereof, to produce an intermediate polymer composition; and thereafter, concurrently heating and masticating said intermediate polymer composition and evaporating said liquid diluent therefrom at 125 to 300 degrees centigrade, to produce vapors of said liquid diluent and a final polymer composition that is substantially free of said liquid diluent and which comprises about 5 to about 50 weight percent of said adduct.

2. A process which comprises mixing at about 25 to about 200 degrees centigrade (1) a thermoplastic polymer of an ethlenically unsaturated aliphatic, cycloaliphatic or aromatic hydrocarbon of 2 to about 8 carbon atoms per molecule and (2) an adduct of polybutadiene and hexachlorocyclopentadiene, in the presence of (3) about 100 to about 1900 weight percent based on the weight of said adduct of hexachlorocyclopentadiene to produce an intermediate polymer composition; and thereafter, concurrently heating and masticating said intermediate polymer composition and withdrawing the resulting vapors of said hexachlorocyclopentadiene from the polymer composition at 125 to 300 degrees centigrade, to produce a final polymer composition that is substantially free of unreacted hexachlorocyclopentadiene and which comprises about 5 to about 50 weight percent of said adduct.

3. The process of claim 2 wherein the intermediate polymer composition is heated to a temperature in the range of 150 to 250 degrees centigrade.

4. The process of claim 3 wherein the polymer of an ethylenically unsaturated hydrogcarbon is polypropylene.

5. The process of claim 3 wherein the polymer of an ethylenically unsaturated hydrocarbon is polyethylene.

6. A process which comprises (1) mixing a thermoplastic polymer of an ethylenically unsaturated aliphatic, cycloaliphatic or aromatic hydrocarbon of 2 to about 8 carbon atoms per molecule with a mixture of (2) an adduct of a butadiene polymer and a polyhalogenated cyclopentadiene, and (3) about 100 to about 1900 weight percent based on the weight of said adduct of a polyhalogenated cyclopentadiene, at a temperature in the range of 25 to 200 degrees centigrade.

7. A process which comprises concurrently heating and masticating at 125 to 300 degrees centigrade a composition comprised of (1) a thermoplastic polymer of an ethylenically unsaturated aliphatic, cycloaliphatic or aromatic hydrocarbon of 2 to about 8 carbon atoms per molecule, (2) an adduct of a butadiene polymer and a polyhalogenated cyclopentadiene, and (3) about 100 to about 1900 weight percent based on the weight of said adduct of a liquid diluent selected from the group consisting of a polyhalogenated cyclopentadiene, an inert diluent and mixtures thereof, to evaporate said liquid diluent from said composition, and to produce a polymer composition that is substantially free of said liquid diluent and which comprises about 5 to about 50 weight percent of said adduct.

8. A process which comprises introducing (1) a thermoplastic polymer of an ethylenically unsaturated aliphatic, cycloaliphatic or aromatic hydrocarbon of 2 to about 8 carbon atoms per molecule, (2) an adduct of a butadiene polymer and a polyhalogenated cyclopentadiene, and (3) about 100 to about 1900 weight percent based on the weight of said adduct of a liquid diluent selected from the group consisting of a polyhalogenated cyclopentadiene, an inert diluent and mixtures thereof, to a zone heated at 125 to 300 degrees centigrade wherein the composition is intimately mixed and the liquid diluent is evaporated; and recovering as products from said zone, vapors of the liquid diluent and a polymer composition that is substantially free of said liquid diluent and which comprises about 5 to about 50 weight percent of said adduct.

9. A process for preparing a polymer composition which comprises (1) reacting a butadiene polymer with a polyhalogenated cyclopentadiene at a temperature in the range of 70 to 200 degrees centigrade and in a proportion to provide a crude reaction mixture at the end of the reaction which contains up to about 50 weight percent halogen containing polymer in a liquid diluent selected from the group consisting of a polyhalogenated cyclopentadiene, an inert diluent and mixtures thereof, and (2) mixing a thermoplastic polymer of an ethylenically unsaturated aliphatic, cycloaliphatic or aromatic hydrocarbon of 2 to about 8 carbon atoms per molecule with said crude reaction mixture at a temperature in the range of 25 to 200 degrees centigrade, wherein said hydrocarbon polymer comprises about 50 to about 95 parts by weight of said polymer composition.

10. A process for preparing a fire retardant polymer composition which comprises (1) reacting a butadiene polymer with a polyhalogenated cyclopentadiene at a temperature in the range of 70 to 200 degrees centigrade and in a proportion to provide a crude reaction mixture at the end of the reaction which contains up to about 50 weight percent halogen containing polymer in a liquid diluent selected from the group consisting of a polyhalogenated cyclopentadiene, an inert diluent and mixtures thereof, (2) mixing about 50 to about 95 parts by weight based on the weight of the polymer composition of a thermoplastic polymer of an ethylenically unsaturated aliphatic, cycloaliphatic or aromatic hydrocarbon of 2 to about 8 carbon atoms per molecule with said crude reaction mixture to produce an intermediate polymer composition, and thereafter (3) concurrently heating and masticating the said intermediate polymer composition at 125 to 300 degrees centigrade to evaporate said liquid diluent therefrom and to produce a final polymer composition that is substantially free of said liquid diluent.

11. A process for preparing a fire retardant polymer composition which comprises (1) reacting a polybutadiene with hexachlorocyclopentadiene at a temperature in the range of 70 to 200 degrees centigrade and in a proportion to provide a crude reaction mixture at the end of the reaction which contains up to about 50 weight percent chlorine- containing polymer in unreacted hexachlorocyclopentadiene, (2) mixing a thermoplastic polymer of an ethylenically unsaturated aliphatic, cycloaliphatic or aromatic hydrocarbon of 2 to about 8 carbon atoms per molecule and an antimony compound with said crude reaction mixture to produce an intermediate polymer composition, and thereafter (3) concurrently heating and masticating the said intermedaite polymer compostion at 125 to 300 degrees centigrade to evaporate said hexachlorocyclopentadiene therefrom and to produce a final polymer composition that is substantially free of unreacted hexachlorocyclopentadiene, wherein said adduct comprises about 5 to about 50 parts by weight of the polymer composition and wherein said antimony compound comprises up to about 30 percent by weight of the polymer composition.

12. The process of claim 11 wherein the antimony compound is antimony oxide.

13. The process of claim 12 wherein the polymer of an ethylenically unsaturated hydrocarbon is polypropylene.

14. The process of claim 12 wherein the polymer of an ethylenically unsaturated hydrocarbon is polyethylene.

References Cited

UNITED STATES PATENTS

| | | |
|---|---|---|
| 2,701,211 | 2/1955 | Taylor et al. _____ 260—34.2 XR |
| 2,863,848 | 12/1958 | Robitschek et al. |
| 2,967,842 | 1/1961 | Roberts _____ 260—876 XR |
| 3,205,196 | 9/1965 | Creighton. |
| 3,268,475 | 8/1966 | Hoch et al. _____ 260—94.7 XR |

FOREIGN PATENTS 931,915    7/1963    Great Britain.

MURRAY TILLMAN, Primary Examiner

M. J. TULLY, Assistant Examiner

U.S. Cl. X.R.

260—33.6, 33.8, 34.2, 45.75, 94..7, 96, 876, 890, 892

PO-1050
(5/69)

UNITED STATES PATENT OFFICE
CERTIFICATE OF CORRECTION

Patent No. 3,494,985          Dated February 10, 1970

Inventor(s)          Raymond R. Hindersinn et al.

It is certified that error appears in the above-identified patent and that said Letters Patent are hereby corrected as shown below:

Column 2, line 36, for "if catalyst" read -- if a catalyst --.
Column 3, line 41, for "1,2-butadiene" read -- 1,3-butadiene --.
Column 6, line 60, for "ASTM D-635-56T" read -- ASTM test D-635 56T --.
Column 7, line 16, for "dough" read -- doughy --. Column 8, line 8, for "1,327" read -- 1,372 --. Column 9, line 24, for "hydrogarbon" read -- hydrocarbon --.

SIGNED AND
SEALED
JUL 7 1970

(SEAL)
Attest:

Edward M. Fletcher, Jr.
Attesting Officer

WILLIAM E. SCHUYLER, JR.
Commissioner of Patents